(12) United States Patent
Chen et al.

(10) Patent No.: US 11,275,765 B2
(45) Date of Patent: Mar. 15, 2022

(54) STORAGE SYSTEMS CONFIGURED FOR STORAGE VOLUME ADDITION IN SYNCHRONOUS REPLICATION USING ACTIVE-ACTIVE CONFIGURATION

(71) Applicant: EMC IP Holding Company LLC, Hopkinton, MA (US)

(72) Inventors: Xiangping Chen, Sherborn, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 491 days.

(21) Appl. No.: 16/259,280

(22) Filed: Jan. 28, 2019

(65) Prior Publication Data
US 2020/0242130 A1    Jul. 30, 2020

(51) Int. Cl.
*G06F 11/20* (2006.01)
*G06F 16/27* (2019.01)
(Continued)

(52) U.S. Cl.
CPC ........ *G06F 16/275* (2019.01); *G06F 11/1662* (2013.01); *G06F 11/2076* (2013.01);
(Continued)

(58) Field of Classification Search
CPC .. G06F 16/275; G06F 3/0607; G06F 11/1662; G06F 11/2076; G06F 11/2082;
(Continued)

(56) References Cited

U.S. PATENT DOCUMENTS 7,444,464 B2    10/2008 Urmston et al.
8,095,726 B1    1/2012 O'Connell et al.
(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Marcin R Filipczyk
(74) *Attorney, Agent, or Firm* — Ryan, Mason & Lewis, LLP

(57) ABSTRACT

An apparatus in one embodiment comprises at least one processing device comprising a processor coupled to a memory. The at least one processing device is configured to identify a storage volume to be added to a first consistency group of a first synchronous replication session between a first storage system and a second storage system in an active-active configuration, to create a second synchronous replication session for the added storage volume between the first storage system and the second storage system, and to merge the first and second synchronous replication sessions responsive to one or more designated criteria. The second synchronous replication session is illustratively configured to be fully independent of the first synchronous replication session. Merging the first and second synchronous replication sessions responsive to one or more designated criteria illustratively comprises merging the first and second synchronous replication sessions responsive to the second synchronous replication session reaching a specified steady state.

20 Claims, 6 Drawing Sheets

(51) Int. Cl.
  *G06F 11/16* (2006.01)
  *H04N 5/931* (2006.01)
(52) U.S. Cl.
  CPC ...... *G06F 11/2082* (2013.01); *G06F 2201/82*
    (2013.01); *G06F 2201/84* (2013.01); *H04N*
    *5/9315* (2013.01)
(58) Field of Classification Search
  CPC ............ G06F 2201/82; G06F 2201/84; H04N
    5/9315
  See application file for complete search history.

(56) References Cited

U.S. PATENT DOCUMENTS

| | | | |
|---|---|---|---|
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,811,541 | B2 * | 11/2017 | Revanuru ......... H04L 29/06088 |
| 10,025,843 | B1 * | 7/2018 | Meiri ................. G06F 11/2058 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0325824 | A1 | 12/2013 | Shoens |
| 2014/0181016 | A1 | 6/2014 | Whitehead et al. |
| 2014/0279855 | A1 * | 9/2014 | Tan ....................... G06F 16/273 707/609 |
| 2016/0150012 | A1 * | 5/2016 | Barszczak ............... G06F 3/067 709/219 |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.
EMC Corporation, "Introduction to XtremIO Virtual Copies," White Paper, Mar. 2016, 39 pages.
EMC Corporation, "XtremIO Data Production (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
EMC Corporation, "High Availability, Data Protection and Data Integrity in the XtremIO Architecture," White Paper, Apr. 2015, 28 pages.
Y. Zhang et al., "End-to-End Integrity for File Systems: A ZFS Case Study," Proceedings of the 8th USENIX Conference on File and Storage Technologies (FAST), Feb. 23-26, 2010, 14 pages.
Dell EMC, "Introduction to Dell EMC XtremIO X2 Storage Array—A Detailed Review," Dell EMC White Paper, Aug. 2017, 46 pages.
N. Tolia et al., "Opportunistic Use of Content Addressable Storage for Distributed File Systems," Proceedings of the USENIX Annual Technical Conference, Jun. 9-14, 2003, 14 pages.
EMC Corporation, "EMC Recoverpoint Replication of XtremIO: Understanding the Essentials of RecoverPoint Snap-Based Replication for XtremIO," EMC White Paper, Aug. 2015, 31 pages.
Dell EMC, "Introduction to Dell EMC XtremIO X2 Storage Array—A Detailed Review," Dell EMC White Paper, Apr. 2018, 52 pages.
Dell EMC, "Introduction to XtremIO Metadata-Aware Replication," Dell EMC White Paper, Apr. 2018, 18 pages.
Kris Piepho, "Dell EMC SC Series Storage: Microsoft Multipath I/O," Dell EMC Best Practices, Jan. 2017, 57 pages.

* cited by examiner

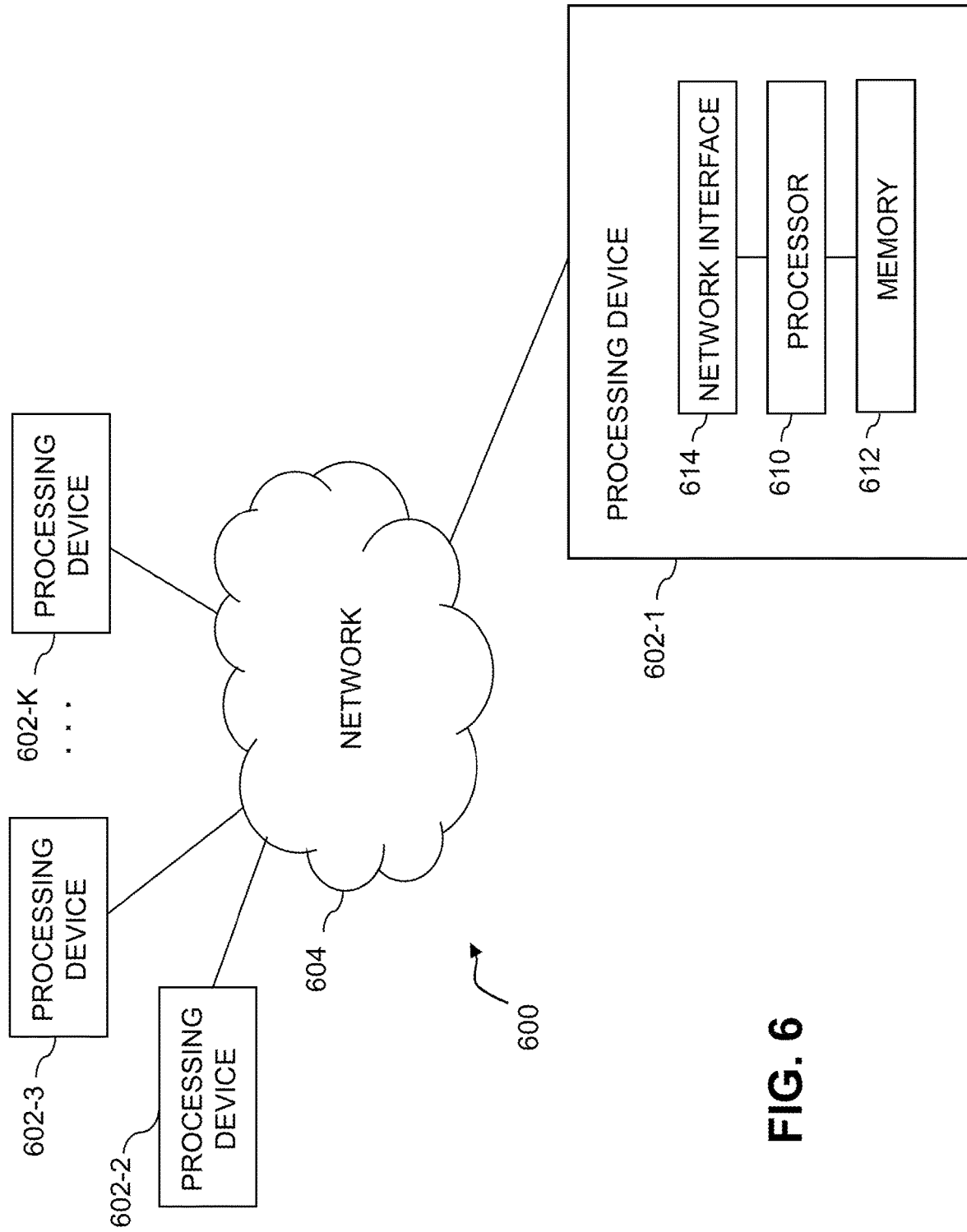

STORAGE SYSTEMS CONFIGURED FOR STORAGE VOLUME ADDITION IN SYNCHRONOUS REPLICATION USING ACTIVE-ACTIVE CONFIGURATION

FIELD

The field relates generally to information processing systems, and more particularly to storage in information processing systems.

BACKGROUND

Many information processing systems are configured to replicate data from one storage system to another storage system, possibly at different physical sites. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business.

Data replication in these and other contexts can be implemented using asynchronous replication at certain times and synchronous replication at other times. For example, asynchronous replication may be configured to periodically transfer data in multiple cycles from a source site to a target site, while synchronous replication may be configured to mirror host writes from the source site to the target site as the writes are made at the source site. Storage systems participating in a replication process can therefore each be configured to support both asynchronous and synchronous replication modes.

Conventional approaches to data replication can be problematic under certain conditions. For example, it can be very difficult to add a storage volume to first and second storage arrays or other types of storage systems during ongoing synchronous replication in an active-active configuration without first terminating the replication session to add the storage volume separately to both storage systems. These and other conventional approaches generally require complex orchestration and in some cases are unable to automatically provide desired failure recovery functionality for the added storage volume.

SUMMARY

Illustrative embodiments provide storage systems configured to support highly efficient storage volume addition in synchronous replication using an active-active configuration. For example, some embodiments advantageously allow one or more storage volumes to be added to a consistency group that is subject to an ongoing synchronous replication process between first and second storage systems in an active-active configuration.

The one or more storage volumes can be added to the consistency group without terminating the replication session and without the need for complex orchestration. Also, the storage volume addition functionality is illustratively implemented in a fail-safe manner. Moreover, illustrative embodiments can automatically provide desired failure recovery functionality for the added storage volume.

The synchronous replication in the active-active configuration in some embodiments is more particularly referred to herein as a "metro replication" arrangement or an "online metro replication" arrangement, although a wide variety of other synchronous replication arrangements in active-active configurations can be used.

The first and second storage systems are illustratively implemented as respective content addressable storage systems, although other types of storage systems can be used in other embodiments.

In one embodiment, an apparatus comprises at least one processing device comprising a processor coupled to a memory and configured to identify a storage volume to be added to a first consistency group of a first synchronous replication session between a first storage system and a second storage system in an active-active configuration, to create a second synchronous replication session for the added storage volume between the first storage system and the second storage system, and to merge the first and second synchronous replication sessions responsive to one or more designated criteria.

The one or more processing devices of the apparatus in some embodiments are part of at least one of the first storage system and the second storage system, and more particularly implement at least a portion of a storage controller of at least one of the first and second storage systems, although numerous alternative implementations are possible. For example, in other embodiments a given processing device is implemented at least in part in a host device configured to communicate over a network with the first and second storage systems. Again, these are only examples, and alternative implementations are possible.

The first and second storage systems in the active-active configuration service input-output (IO) operations received from at least one host device and directed to at least the first consistency group. It is assumed for purposes of illustrative example only that the first storage system is designated as a leader and the second storage system is designated as a follower in the active-active configuration.

The second synchronous replication session is illustratively configured to be fully independent of the first synchronous replication session, and the first and second storage systems are assumed to comprise respective instances of the first consistency group, although other arrangements are possible.

Creating a second synchronous replication session for the added storage volume in some embodiments comprises creating first and second instances of a second consistency group on the respective first and second storage systems using respective instances of the added storage volume, creating a volume pairing between the instances of the added storage volume on the first and second storage systems in order to establish data path mapping between the instances of the added storage volume, copying a volume identity of the instance of the added storage volume on the first storage system to a volume identity of the instance of the added storage volume on the second storage system, disabling IO access for the instance of the added storage volume on the second storage system, and creating the second synchronous replication session between the first and second instances of the second consistency group.

Some embodiments further include initiating a full synchronization cycle for the second consistency group, creating first and second snap sets of a synchronized snap set pair for the respective first and second instances of the second consistency group on the first and second storage systems, initiating a transition from the full synchronization cycle to the second synchronous replication session, and in conjunction with the transition, copying remaining differential data between the first snap set and the first instance of the consistency group on the first storage system to the second storage system. The second synchronous replication session is then enabled between the first and second instances of the second consistency group.

Merging the first and second synchronous replication sessions responsive to one or more designated criteria in some embodiments comprises merging the first and second synchronous replication sessions responsive to the second synchronous replication session reaching a specified steady state.

As a more particular example, merging the first and second synchronous replication sessions responsive to one or more designated criteria comprises setting a to-be-merged flag of the second synchronous replication session with a merge direction identifying the first synchronous replication session, adding the instance of the added storage volume on the second storage system to an instance of the first consistency group on the second storage system, adding the instance of the added storage volume on the first storage system to an instance of the first consistency group on the first storage system, and enabling IO access for the instance of the added storage volume on the second storage system. The to-be-merged flag is cleared subsequent to successful completion of the enabling.

As indicated previously, the first and second storage systems illustratively comprise respective content addressable storage systems, possibly having respective sets of non-volatile memory storage devices. For example, the storage devices of the first and second storage systems in such embodiments can be configured to collectively provide respective all-flash storage arrays. The first and second storage systems may in some embodiments be associated with different physical sites. For example, the first storage system may be part of a production site data center and the second storage system may be part of a disaster recovery site data center. Numerous other storage system arrangements are possible in other embodiments.

These and other illustrative embodiments include, without limitation, apparatus, systems, methods and processor-readable storage media.

BRIEF DESCRIPTION OF THE DRAWINGS

FIGS. 5 and 6 show examples of processing platforms that may be utilized to implement at least a portion of an information processing system in illustrative embodiments.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
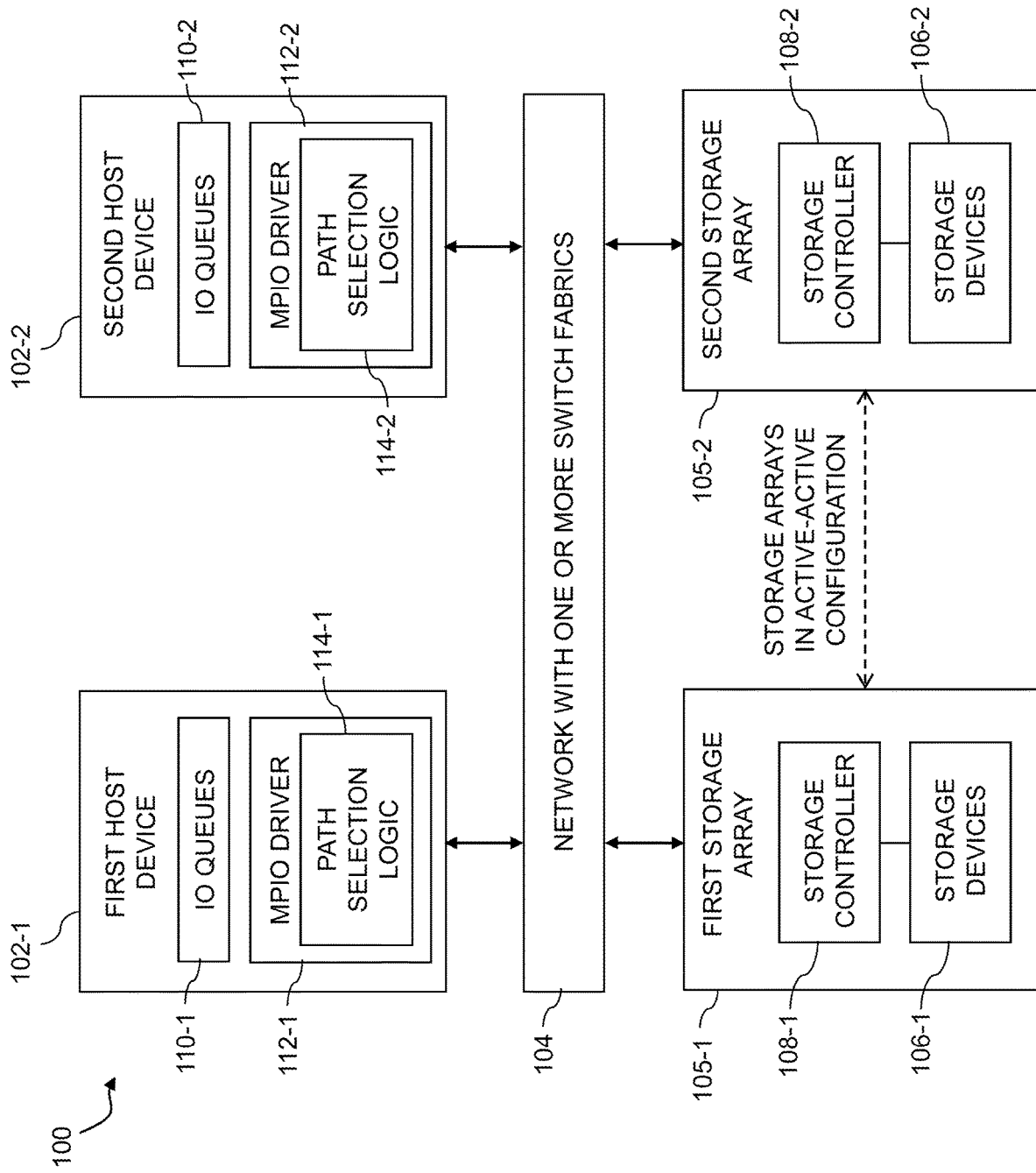
FIG. 1 is a block diagram of an information processing system comprising first and second storage arrays configured with functionality for storage volume addition in synchronous replication using an active-active configuration in an illustrative embodiment.

FIG. 1 shows an information processing system 100 configured in accordance with an illustrative embodiment. The information processing system 100 comprises at least first and second host devices 102-1 and 102-2. The host devices 102 are coupled to a network 104 that comprises one or more switch fabrics. The host devices communicate over the network 104 via the one or more switch fabrics with at least first and second storage arrays 105-1 and 105-2. For example, the network 104 illustratively comprises at least one storage area network (SAN) and the one or more switch fabrics illustratively comprise respective distinct switch fabrics of a set of multiple switch fabrics interconnecting the host devices 102 with the storage arrays 105 over the one or more SANs. Each of the one or more switch fabrics in some embodiments is associated with a different SAN.

The system 100 may be configured such that the first host device 102-1 communicates with the first storage array 105-1 over a first switch fabric and communicates with the second storage array 105-2 over a second switch fabric. Similarly, the second host device 102-2 can communicate with the first storage array 105-1 over the first switch fabric and communicate with the second storage array 105-2 over the second switch fabric. Numerous other interconnection arrangements are possible.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices capable of communicating with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect storage system components. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2 coupled to respective storage controllers 108-1 and 108-2.

The storage devices 106 of the storage arrays 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAIVI). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

The storage arrays 105 may each additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. The term "storage device" as used herein is therefore intended to be broadly construed, and so may encompass, for example, SSDs, HDDs, flash drives, hybrid drives or other types of storage products and devices, or portions thereof, and illustratively include logical storage devices such as logical units (LUNs).

As another example, the storage arrays 105 may each be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

The sets of storage devices 106 of the respective storage arrays 105 store data utilized by one or more applications running on one or more of the host devices 102. The sets of storage devices 106 are illustratively arranged in one or more storage pools. The storage arrays 105 and their respective sets of storage devices 106 are examples of what are more generally referred to herein as "storage systems." A given such storage system in the present embodiment may be shared by the host devices 102, and in such arrangements may be referred to as a "shared storage system."

The sets of storage devices 106 of the storage arrays 105 implement LUNs configured to store objects for users associated with the host devices 102. These objects can comprise files, blocks or other types of objects.

The host devices 102 interact with the storage arrays 105 utilizing read and write commands as well as other types of commands that are transmitted over the network 104. Such commands in some embodiments more particularly comprise Small Computer System Interface (SCSI) commands, although other types of commands may be used in other embodiments, including commands that are part of a standard command set, or custom commands such as a "vendor unique command" or VU command that is not part of a standard command set. A given input-output (IO) operation as that term is broadly used herein illustratively comprises one or more such commands.

References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Also, the term "storage device" as broadly used herein can encompass, for example, a logical storage device such as a LUN or other logical storage volume. A logical storage device can be defined in the storage arrays 105 to include different portions of one or more physical storage devices. The sets of storage devices 106 may therefore be viewed as comprising respective LUNs or other logical storage volumes.

Each of the host devices 102 illustratively has multiple paths to each of the storage arrays 105, with at least one storage device of one of the storage arrays 105 being visible to that host device on a given one of the paths. A given one of the storage devices 106 may be accessible to the given host device over multiple paths. Each of the host devices 102 illustratively has a plurality of paths to each of the storage arrays 105 via the network 104, although numerous other arrangements are possible. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below in conjunction with FIGS. 5 and 6.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

In some embodiments, at least one of the storage arrays 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage arrays 105 in other embodiments.

The term "storage system" as used herein is therefore intended to be broadly construed, and should not be viewed as being limited to content addressable storage systems or flash-based storage systems. A given storage system as the term is broadly used herein can comprise, for example, the above-noted SANs, network-attached storage (NAS), direct-attached storage (DAS) or distributed DAS, as well as combinations of these and other storage types, including software-defined storage.

Other particular types of storage products that can be used in implementing storage arrays 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage arrays 105-1 and 105-2 are assumed to be arranged in an active-active configuration. In such an arrangement, data stored in one of the storage arrays is replicated to the other one of the storage arrays utilizing a replication process. Such data replication across the multiple storage arrays 105 can be used to facilitate failure recovery in the system 100. One of the storage arrays may therefore operate as a production storage array relative to the other storage array which operates as a backup or recovery storage array.

In the present embodiment, it is assumed that the storage arrays 105-1 and 105-2 participate in a replication process that more particularly comprises a synchronous replication process using an active-active configuration. The synchronous replication is illustrative configured to mirror data writes from one or more of the host devices 102 to both of the storage arrays 105. Other types of replication processes may be used in other embodiments.

For example, a "replication process" as that term is broadly used herein may include both asynchronous and synchronous replication modes as well as support for separate operation of these individual modes and support for controlled transitioning between the individual modes. It is also possible in some embodiments that a given replication process implemented using storage arrays 105 may comprise only a synchronous replication mode, instead of multiple distinct replication modes.

It is assumed that the storage controllers 108 of the respective storage arrays 105 each comprise replication control logic and a snapshot generator. The replication control logic controls performance of the above-noted synchronous replication process. The snapshot generator is used to generate snapshots of one or more storage volumes that are subject to synchronous replication using an active-active configuration.

The snapshots generated by the storage controllers 108 of the storage arrays 105 illustratively comprise respective point-in-time (PIT) replicas of the storage volumes. Multiple snapshots generated over time for a given storage volume can collectively comprise a "snapshot group" and information characterizing those snapshots in some embodiments is stored in the form of a snapshot tree or other arrangement of one or more data structures suitable for storing information characterizing a snapshot group.

A set of snapshot trees maintained for respective different storage volumes are collectively referred to as comprising a "snapshot set." In some embodiments, a snapshot tree for a given storage volume is configured to add a new node each time a new snapshot is generated for that storage volume. The term "snapshot" as used herein is intended to be broadly construed, and in some embodiments may encompass a complete PIT replica or other types of information characterizing the state of a given storage volume at a particular time.

A given storage volume designated for synchronous replication between storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2, and respective multi-path input-output (MPIO) drivers 112-1 and 112-2. The MPIO drivers 112 collectively comprise a multi-path layer of the host devices 102. The multi-path layer provides automated path selection functionality using respective instances of path selection logic 114-1 and 114-2 implemented within the MPIO drivers 112.

The MPIO drivers 112 may comprise, for example, PowerPath drivers from Dell EMC. Other types of MPIO drivers from other driver vendors may be utilized in illustrative embodiments.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

A given retry of a failed IO operation under such a path selection algorithm can select a path having a different host device HBA and storage array port for a given retry than that of the path selected for the original failed IO operation.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

In these and other situations, path discovery scans may be repeated as needed in order to discover the addition of new paths or the deletion of existing paths.

A given path discovery scan can be performed utilizing known functionality of conventional MPIO drivers, such as PowerPath drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible.

For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path.

The above-described functions associated with automated path selection functionality of the MPIO driver 112-1 are illustratively carried out at least in part under the control of its path selection logic 114-1.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform the disclosed automated path selection functionality. Accordingly, automated path selection functionality described above in the context of the first MPIO driver 112-1 is assumed to be similarly performed by the other MPIO driver 112-2. The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein.

As will be described in more detail below, the storage arrays 105 are further configured to perform additional operations associated with storage volume addition functionality that allows one or more storage volumes to be added to a consistency group in an ongoing synchronous replication process using the active-active configuration.

The one or more storage volumes can be added to the consistency group without terminating the replication session and without the need for complex orchestration. Also, the storage volume addition functionality is illustratively implemented in a fail-safe manner. Moreover, illustrative embodiments can automatically provide desired failure recovery functionality for the added storage volume. Such arrangements therefore advantageously avoid the difficulties that would otherwise be associated with terminating the replication session to add the storage volume separately to both storage systems.

The storage volume addition functionality implemented by the storage arrays 105 of system 100 will now be described in further detail with reference to the block diagram of FIG. 2 and the flow diagram of FIG. 3.

Figure 2:
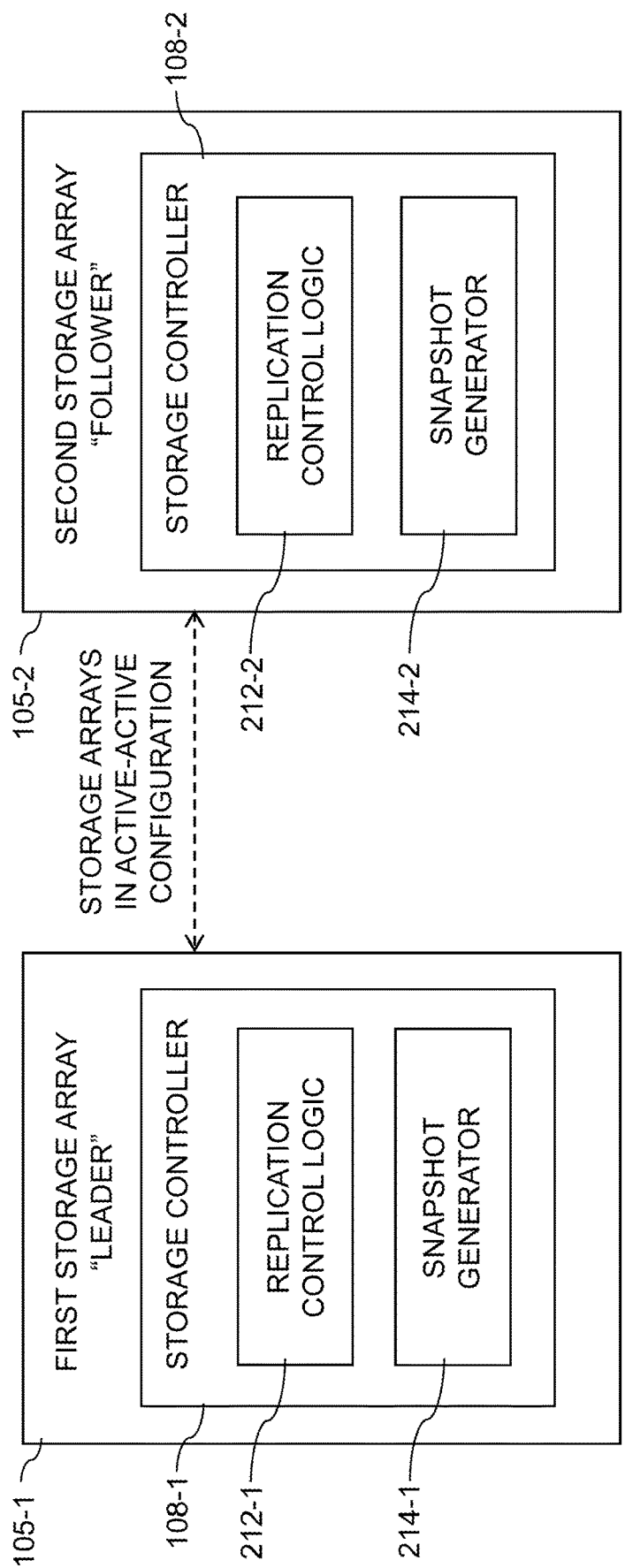
FIG. 2 shows a more detailed view of the first and second storage arrays of FIG. 1.

Referring initially to FIG. 2, the first and second storage arrays 105-1 and 105-2 are assumed to implement a protocol in which one of the storage arrays is designated as a "leader" and the other is designated as a "follower." In the figure, the first storage array 105-1 is illustratively shown as the leader and the second storage array 105-2 is illustratively shown as the follower, although these roles could be reversed, and can otherwise change periodically over time in accordance with the particular leader-follower designation protocol that is implemented by the storage arrays 105 in a given embodiment.

The leader illustratively provides a limited-time license or other type of time-to-live (TTL) grant to the follower. An exemplary TTL grant illustratively allows the follower to service IO operations received from one or more of the host devices 102 concurrently with the leader, such that both the leader and the follower are servicing IO operations.

It is assumed without limitation that the first and second storage arrays 105-1 and 105-2 have respective local clock sources that are at least partially synchronized relative to one another, such that the two storage arrays can maintain a consistent view of the expiration times of respective ones of the above-noted TTL grants. Other coordination arrangements can be used in other embodiments, and TTL grants are not required.

In performing synchronous replication in an active-active configuration, the two storage arrays 105 are illustratively configured to allow one of the host devices 102 to read from and write to a given storage volume of a consistency group potentially comprising multiple storage volumes. The host device illustratively sees the given storage volume as a single storage volume across the two storage arrays 105 that are arranged in the active-active configuration. All relevant parameters of the separate instances of the given storage volume maintained by the separate storage arrays 105 should therefore be the same in each of the storage arrays 105. Read IO operations directed to the storage volume are serviced by the storage array receiving those operations. Write IO operations directed to the storage volume are executed by the storage array receiving those operations, and are additionally replicated by the receiving storage array to its peer. The two storage arrays 105 in the present embodiment therefore expose the same storage volume with the same data.

The first and second storage arrays 105 in the active-active configuration are assumed to service IO operations received from at least one of the host devices 102 and directed to a designated consistency group comprising one or more logical storage volumes subject to replication in accordance with the replication process.

A cluster state of the active-active configuration of the first and second storage arrays 105 may be in one of multiple possible states at a given point in time, such as "up" or "down," where up and down denote two possible cluster states, and can be viewed as corresponding generally to an "on" state in which the active-active configuration is engaged, and an "off" state in which the active-active configuration is suspended.

The second storage array 105-2 in some embodiments terminates its servicing of IO operations directed to a consistency group comprising one or more logical storage volumes responsive to a current local time at the second storage array 105-2 reaching an expiration time of a TTL grant.

Various types of messaging can be used to convey requests and responses between the storage arrays 105. For example, a request for a TTL grant can be transmitted using at least one message sent from the second storage array 105-2 to the first storage array 105-1, and a corresponding TTL grant can be transmitted using at least one message sent from the first storage array 105-1 to the second storage array 105-2. The messaging used to convey requests from the second storage array 105-2 to the first storage array 105-1 and to convey corresponding TTL grants from the first storage array 105-1 to the second storage array 105-2 can be implemented using any of a variety of command formats or communication protocols, such as the above-noted SCSI commands or other types of vendor unique or non-standard commands, possibly transmitted directly over a Fibre Channel connection between the two storage arrays or indirectly via one or more switch fabrics of the network 104.

Again, the leader-follower designations assumed above can be reversed, with the second storage array 105-2 being the leader and the first storage array 105-1 being the follower. The various operations performed by each storage array as described previously would then be interchanged.

The storage controllers 108-1 and 108-2 of the respective storage arrays 105-1 and 105-2 are shown in FIG. 2 as including various components that will now be described.

The storage controller 108-1 of the first storage array 105-1 comprises replication control logic 212-1 and a snapshot generator 214-1.

Similarly, the storage controller 108-2 of the second storage array 105-2 comprises replication control logic 212-2 and a snapshot generator 214-2.

Although not explicitly shown in the figure, additional components can be included in the storage controllers 108, such as signature generators utilized in generating content-based signatures of data pages, as well as the above-noted local clock sources and components for implementing a leader-follower designation protocol.

The instances of replication control logic 212-1 and 212-2 are collectively referred to herein as replication control logic 212. Such replication control logic instances are also referred to herein as individually or collectively comprising at least a portion of a "replication engine" of the system 100.

The replication control logic 212 of the storage arrays 105 controls performance of the synchronous replication process carried out between those storage arrays, which as noted above in some embodiments further involves at least one of the host devices 101. The data replicated from the first storage array 105-1 to the second storage array 105-2 illustratively includes all of the data of multiple storage volumes of a consistency group.

Different replication processes of different types can be implemented for different consistency groups comprising different storage volumes. Also, the storage arrays 105 can be configured to operate in different replication modes of different types at different times. For example, the storage arrays can transition from an asynchronous replication mode to a synchronous replication mode and vice versa.

A given storage volume designated for replication from the first storage array 105-1 to the second storage array 105-2 illustratively comprises a set of one or more LUNs or other storage volumes of the first storage array 105-1. Each such LUN or other storage volume illustratively comprises at least a portion of a physical storage space of one or more of the storage devices 106-1. The corresponding replicated LUN or other storage volume of the second storage array 105-2 illustratively comprises at least a portion of a physical storage space of one or more of the storage devices 106-2.

Figure 3:
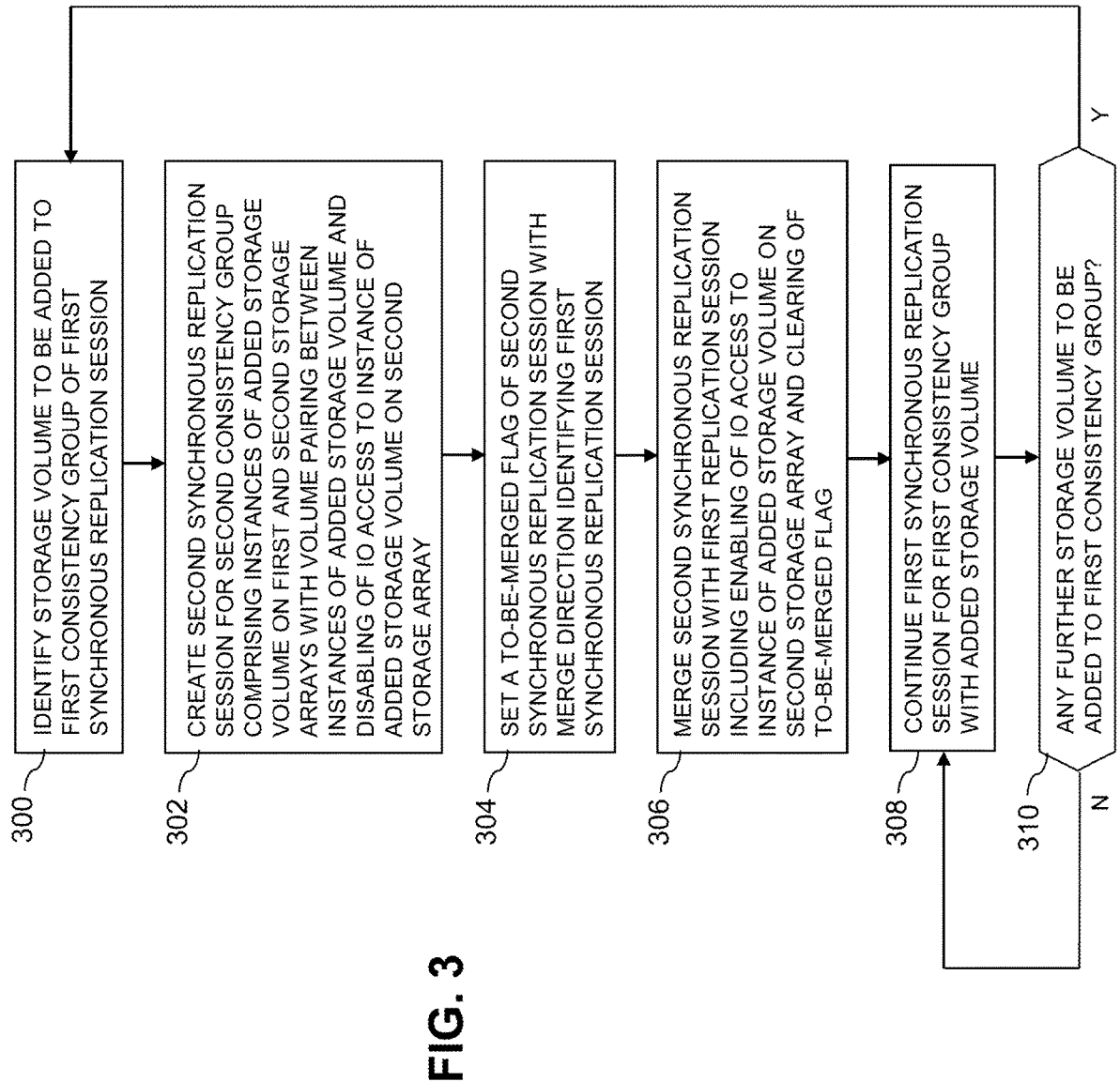
FIG. 3 is a flow diagram of a process for adding a storage volume to a consistency group subject to ongoing synchronous replication from a first storage array to a second storage array in an active-active configuration in an illustrative embodiment.

The replication control logic 212 of the storage arrays 105 in some embodiments is configured to control the performance of corresponding portions of a synchronous replication process of the type illustrated in the flow diagram of FIG. 3. At least one of the host devices 101 in some embodiments can also include one or more instances of replication control logic and possibly also one or more snapshot generators, as well as additional or alternative components such as a signature generator.

The storage controllers 108 of the storage arrays 105 should also be understood to include additional modules and other components typically found in conventional implementations of storage controllers and storage arrays, although such additional modules and other components are omitted from FIGS. 1 and 2 for clarity and simplicity of illustration.

It will be assumed for the following description of illustrative embodiments that there is an ongoing synchronous replication process being carried out between the first storage array 105-1 and the second storage array 105-2 in the system 100, utilizing their respective instances of replication control logic 212-1 and 212-2.

The synchronous replication process more particularly comprises a synchronous replication process in which a consistency group comprising one or more storage volumes is replicated using an active-active configuration. Such an arrangement is illustratively configured to guarantee data consistency between the storage volumes of the consistency group on the two storage arrays 105. The synchronous replication is illustratively implemented at least in part by or otherwise under the control of a replication engine comprising the respective instances of replication control logic 212-1 and 212-2. Other types of replication arrangements can be used in other embodiments.

In operation, the system 100 identifies a storage volume to be added to a first consistency group of a first synchronous replication session between the first storage array 105-1 and the second storage array 105-2 in an active-active configuration, creates a second synchronous replication session for the added storage volume between the first storage array 105-1 and the second storage array 105-2, and merges the first and second synchronous replication sessions responsive to one or more designated criteria. These operations are illustratively performed at least in part by a replication engine of the first and second storage arrays 105, but one or more of the operations can additionally or alternatively involve participation of at least one of the host devices 102.

The first and second storage arrays 105 in the active-active configuration service IO operations received from at least one of the host devices and directed to the first consistency group. As mentioned previously, the first storage array 105-1 is illustratively designated as a leader and the second storage array 105-2 is illustratively designated as a follower in the active-active configuration. The first and second storage arrays 105 comprise respective instances of the first consistency group.

The synchronous replication in the active-active configuration is illustratively configured to guarantee inter-volume data consistency for the respective instances of the first consistency group on the first and second storage arrays 105. In such an arrangement, the instances of the first consistency group on the respective storage arrays 105 are fully in synchronization with the exception of any IO operations that are still in progress. Examples of arrangements of this type are also referred to herein as "metro replication" arrangements or "online metro replication" arrangements, although a wide variety of other synchronous replication arrangements in active-active configurations can be used.

As noted above, a second synchronous replication session is created for the added storage volume. In some embodiments, this more particularly involves creating first and second instances of a second consistency group on the respective first and second storage arrays 105 using respective instances of the added storage volume, creating a volume pairing between the instances of the added storage volume on the first and second storage arrays 105 in order to establish data path mapping between the instances of the added storage volume, copying a volume identity of the instance of the added storage volume on the first storage array 105-1 to a volume identity of the instance of the added storage volume on the second storage array 105-2, disabling IO access for the instance of the added storage volume on the second storage array 105-2, and creating the second synchronous replication session between the first and second instances of the second consistency group.

Additional or alternative operations can be performed in conjunction with the creation of the second synchronous replication session. For example, possible additional operations include initiating a full synchronization cycle for the second consistency group, creating first and second snap sets of a synchronized snap set pair for the respective first and second instances of the second consistency group on the first and second storage arrays 105, and initiating a transition from the full synchronization cycle to the second synchronous replication session. In conjunction with the transition, remaining differential data between the first snap set and the first instance of the consistency group on the first storage array 105-1 is copied to the second storage array 105-2, and the second synchronous replication session between the first and second instances of the second consistency group is enabled.

It is assumed in the present embodiment that the second synchronous replication session is fully independent of the first synchronous replication session, although other arrangements are possible.

As noted above, the first and second synchronous replication sessions are merged responsive to one or more designated criteria. For example, the first and second synchronous replication sessions may be merged responsive to the second synchronous replication session reaching a specified steady state.

In some embodiments, merging the first and second synchronous replication sessions responsive to one or more designated criteria illustratively comprises setting a to-be-merged flag of the second synchronous replication session with a merge direction identifying the first synchronous replication session, adding the instance of the added storage volume on the second storage array 105-2 to an instance of the first consistency group on the second storage array 105-2, adding the instance of the added storage volume on the first storage array 105-1 to an instance of the first consistency group on the first storage array 105-1, and enabling IO access for the instance of the added storage volume on the second storage array 105-2. The to-be-merged flag is cleared subsequent to successful completion of the enabling.

The second synchronous replication session is illustratively terminated subsequent to the successful completion of the above-noted enabling of IO access for the instance of the added storage volume on the second storage array 105-2. The first and second instances of the second consistency group are also removed from the first and second storage arrays 105 subsequent to the successful completion of the enabling of IO access.

At least a portion of the above-described operations can be repeated in one or more iterations if the addition of the storage volume is not successfully completed. For example, the system 100 can be configured to automatically repeat the adding of the instance of the added storage volume on the second storage array 105-2 to the instance of the first consistency group on the second storage array 105-2, the adding of the instance of the added storage volume on the first storage array 105-1 to the instance of the first consistency group on the first storage array 105-1, and the enabling of the IO access for the instance of the added storage volume on the second storage array 105-2, responsive to detection of the to-be-merged flag remaining set subsequent to completion of an initial iteration of those operations.

A more particular example of the storage volume addition functionality described above will now be presented. In this example, the replication control logic instances 212-1 and 212-2 are assumed to cooperate to facilitate storage volume addition in ongoing synchronous replication of a consistency group in an active-active configuration. Like other embodiments herein, the process utilized in the present example advantageously allows one or more storage volumes to be added in a particularly efficient manner as part of an ongoing synchronous replication session, without the need to terminate that session. As will become apparent from the following description, the steps of the process in this particular example also advantageously provide what is referred to herein as a "fail-safe" mechanism for addition of the storage volume within the ongoing synchronous replication session.

The process in the present example generally involves creating a second synchronous replication session for the storage volume to be added, and then merging the two sessions once the second has reached a steady state. It is assumed that the process is initiated by the storage array currently designated as the leader.

The process is illustratively configured to add a storage volume V2 to an existing consistency group CG1 of an ongoing metro replication session RP1. The storage volume V2 is assumed to currently reside in the leader storage array, and the follower storage array need not include any instance of storage volume V2. If the storage volume V2 does not currently reside in the leader storage array, the leader-follower designation should be switched before the process is initiated.

To add the storage volume V2 to the metro replication session RP1 for the consistency group CG1, the process initially creates a new metro replication session to replicate V2 data to the follower storage array using these steps:

1. Create a second consistency group having an instance CG2 with V2 on the leader storage array, and an instance CG2' with V2' on the follower storage array.

2. Create volume pair VP2 to establish data path mapping between V2 and V2', and copy the volume identity of V2 to V2' with volume IO access disabled on V2'.

3. Create a new metro replication session RP2 between CG2 and CG2'.

4. Start an initial full synchronization cycle for RP2 to transfer the bulk of the V2 data to the follower storage array, and create snap sets SS2 and SS2' on the respective leader and follower storage arrays as a synchronized snap set pair.

5. Once the initial full synchronization cycle completes, start a "transition-to-metro" cycle for RP2 to transfer final difference data ("delta") between CG2 and SS2 to the follower storage array, and enables metro replication IO from CG2 to CG2'.

At this point in the process, V2' has its volume IO access disabled, such that the replication IO only flows from V2 to V2'. The disabling of V2' volume IO access in this embodiment ensures that if any of the above steps fail prior to completion, the steps can just be rerun from the beginning without any adverse consequences. Furthermore, the new replication session RP2 is fully independent of RP1, such that any failure and/or failure recovery relating to RP2 has no impact on RP1.

Once RP2 reaches a steady metro replication state, the process begins to merge RP1 and RP2 seamlessly using these steps:

1. Set a "to-be-merged" flag in RP2 with an indication of a merge direction to RP1. No change is made to RP1.

2. Add V2' to CG1' at the follower storage array. Now V2' is associated with both CG2' and CG1'. Such an arrangement ensures that if the current step fails before the leader storage array has completed moving V2 to CG1 in the following step below, the data replication for V2 to V2' is not interrupted as it can still proceed through RP2 session channels. Since there is only one VP2 label, there is no ambiguity of mapping replication IO from V2 to V2' even though it is in two consistency groups.

3. Add V2 to CG1 at the leader storage array. All replication IOs from V2 will now carry an RP1 label, instead of an RP2 label.

4. Enable volume IO access in V2' and start true active-active replication for RP1 (with V2 now added to CG1).

5. As part of a final clean up, remove RP2, CG2 and CG2' from the storage arrays.

The merging portion of the process can be interrupted or otherwise fail at any point from step 2 to step 5 above. In the event of such a failure, the process can be automatically restarted from step 2 in response to a set "to-be-merged" flag in RP2. Steps 2 to 5 of the merging portion of the process are configured so as to be idempotent and have no impact on ongoing replication of IOs to RP1 or RP2.

In the above example, the process steps are assumed to be performed primarily by the first and second storage arrays 105 operating in cooperation via a replication engine comprising their respective replication control logic instances 212-1 and 212-2. Other arrangements of process steps can be used in other embodiments. Also, the particular ordering of the steps shown above can be varied.

The above-described illustrative embodiments are examples of what are referred to herein as "storage volume addition" performed in synchronous replication using an active-active configuration. The additional storage volume is added in a fail-safe manner and without the need to disrupt the ongoing synchronous replication session or any of its desired recovery point objectives.

These and other operations associated with storage volume addition in the system 100 are illustratively performed by or otherwise under the control of the storage controllers 108 of the respective storage arrays 105, utilizing replication control logic instances 212-1 and 212-2 to provide storage volume addition support.

It is to be appreciated that these and other features of illustrative embodiments are presented by way of example only, and should not be construed as limiting in any way. Accordingly, different numbers, types and arrangements of system components such as host devices 102, network 104, storage arrays 105, storage devices 106, storage controllers 108, IO queues 110 and MPIO drivers 112 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, various aspects of the above-described storage volume addition functionality can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 3. The FIG. 3 process is suitable for use in the system 100 but is more generally applicable to other types of information processing systems each comprising at least one host device and first and second storage systems arranged in an active-active configuration. The first and second storage systems in this embodiment are more particularly assumed to comprise respective first and second storage arrays arranged in an active-active configuration, with each storage array having a plurality of storage devices. The storage devices can include logical storage devices such as LUNs or other logical storage volumes. The first and second storage arrays are assumed to be designated as "leader" and "follower" respectively as in the FIG. 2 embodiment, although that scenario can be reversed in other embodiments.

The steps of the process are illustratively performed primarily by the first and second storage arrays, such as the first and second storage arrays 105 in system 100, although other arrangements of system components can perform at least portions of one or more of the steps in other embodiments. For example, in some embodiments one or more steps of the process can be carried out at least in part by a host device, such as one of the host devices 102. The process includes steps 300 through 310.

In step 300, at least one storage volume to be added to a first consistency group of a first synchronous replication session is identified. The identified storage volume comprises a storage volume of the first storage array that is not currently part of the first consistency group. Multiple storage volumes can be identified for addition to the first consistency group in step 300. For example, one or more sets of storage volumes each comprising a plurality of storage volumes can be identified. It will be assumed for clarity and simplicity of the following description that a single storage volume is identified for addition, but the techniques described can be extended in a straightforward manner to multiple identified storage volumes as well as multiple sets of storage volumes.

In step 302, a second synchronous replication session is created for a second consistency group comprising instances of the added storage volume on the first and second storage arrays. Volume pairing is established between the instances of added storage volume and IO access to the instance of the added storage volume on the second storage array is disabled.

In step 304, a to-be-merged flag of a second synchronous replication session is set, with an associated merge direction identifying the first synchronous replication session.

In step 306, the second synchronous replication session is merged with the first replication session, including enabling of IO access to the instance of the added storage volume on the second storage array and clearing of to-be-merged flag.

In step 308, the first synchronous replication session continues for the first consistency group which now includes the added storage volume.

In step 310, a determination is made as to whether or not there is any further storage volume or volumes to be added to the first consistency group. If there is at least one storage volume to be added to the first consistency group, the process returns to step 300 to initiate the addition of that storage volume to the first consistency group. Otherwise, the process returns to step 308 as indicated in order to continue the first synchronous replication session with the first consistency group.

The particular processing operations and other system functionality described in conjunction with the flow diagram of FIG. 3 are presented by way of illustrative example only, and should not be construed as limiting the scope of the disclosure in any way. Alternative embodiments can use other types of processing operations for storage volume addition in synchronous replication using an active-active configuration. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different storage volume addition processes for respective different sets of one or more storage volumes, different consistency groups, or different storage systems or portions thereof within a given information processing system.

Functionality such as that described in conjunction with the flow diagram of FIG. 3 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, storage controllers such as storage controllers 108 of storage arrays 105 that are configured to control performance of one or more steps of the FIG. 3 process in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or LXCs. The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate storage volume addition techniques for an active-active configuration as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of a given one of the storage arrays 105, and accordingly is assumed to be coupled to the other one of the storage arrays 105 and to one or more of the host devices 102 within the information processing system 100.

The storage controller 408 in the present embodiment is configured to implement storage volume addition functionality of the type previously described herein. For example, the content addressable storage system 405 illustratively participates in a synchronous replication process with another instance of the content addressable storage system 405, with the two storage systems being arranged in an active-active configuration relative to one another.

The storage controller 408 includes distributed modules 412 and 414, which are configured to operate in a manner similar to that described above for respective corresponding replication control logic 212 and snapshot generators 214 of the storage controllers 108 of system 100. Module 412 is more particularly referred to as distributed replication control logic, and illustratively comprises multiple replication control logic instances on respective ones of a plurality of distinct nodes. Module 414 is more particularly referred to as a distributed snapshot generator, and illustratively comprises multiple snapshot generation instances on respective ones of the distinct nodes.

Figure 4:
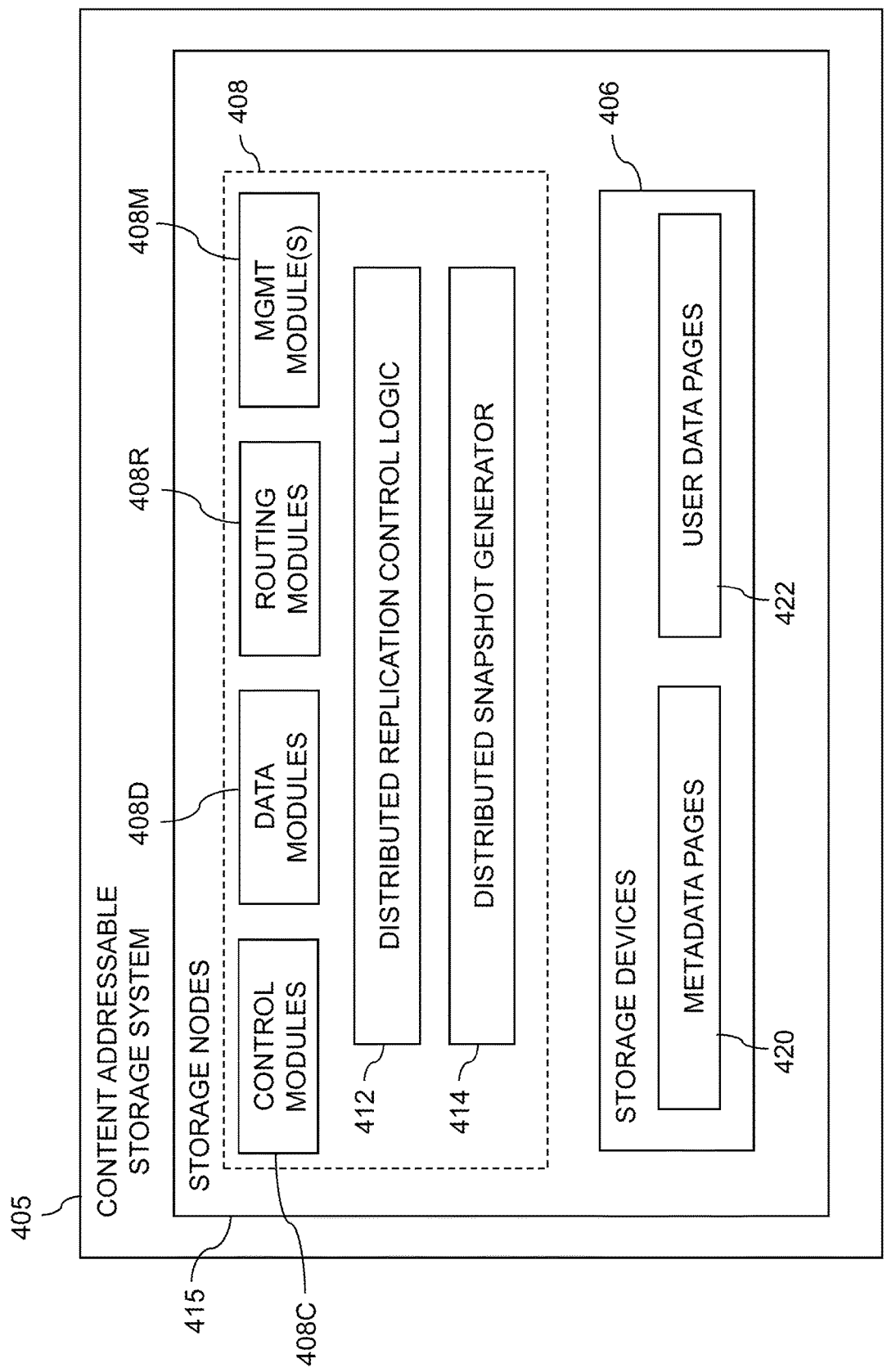
FIG. 4 shows a content addressable storage system having a distributed storage controller configured with functionality for storage volume addition in synchronous replication using an active-active configuration in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Such storage nodes 415 are examples of the "distinct nodes" referred to above, and other clustered storage system arrangements comprising multiple storage nodes and possibly additional or alternative nodes can be used in other embodiments. A given clustered storage system may therefore include not only storage nodes 415 but also additional storage nodes, compute nodes or other types of nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as separate modules of the distributed storage controller 408, the modules 412 and 414 in the present embodiment are assumed to be distributed at least in part over at least a subset of the other modules 408C, 408D, 408R and 408M of the storage controller 408. Accordingly, at least portions of the storage volume addition functionality of the modules 412 and 414 may be implemented in one or more of the other modules of the storage controller 408. In other embodiments, the modules 412 and 414 may be implemented as respective stand-alone modules that are completely separate from the other modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users of the content addressable storage system 405. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume subject to replication in an active-active configuration with storage volume addition functionality implemented using modules 412 and 414 illustratively comprises a set of one or more LUNs of the content addressable storage system 405, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

As indicated above, the storage volume addition functionality provided by modules 412 and 414 in this embodiment is assumed to be distributed across multiple distributed processing modules, including at least a subset of the processing modules 408C, 408D, 408R and 408M of the distributed storage controller 408.

For example, the management module 408M of the storage controller 408 may include a replication control logic instance that engages corresponding replication control logic instances in all of the control modules 408C and routing modules 408R in order to implement a synchronous replication process.

In some embodiments, the content addressable storage system 405 comprises an XtremIO™ storage array suitably modified to incorporate techniques for storage volume addition as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, storage volume addition functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device over a network. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement storage volume addition functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with storage volume addition functionality as disclosed herein can provide a number of significant advantages relative to conventional arrangements.

For example, some embodiments are advantageously configured to provide accurate and efficient storage volume addition for multiple storage systems arranged in an active-active configuration with synchronous replication.

The one or more storage volumes can be added to the consistency group without terminating the replication session and without the need for complex orchestration.

Also, the storage volume addition functionality is illustratively implemented in a fail-safe manner.

Moreover, illustrative embodiments can automatically provide desired failure recovery functionality for the added storage volume.

Illustrative embodiments therefore advantageously avoid the difficulties that would otherwise be associated with terminating the replication session to add the storage volume separately to both storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement storage systems and possibly one or more associated host devices will now be described in greater detail with reference to FIGS. 5 and 6. Although described in the context of system 100, these platforms may also be used to implement at least portions of other information processing systems in other embodiments.

Figure 5:
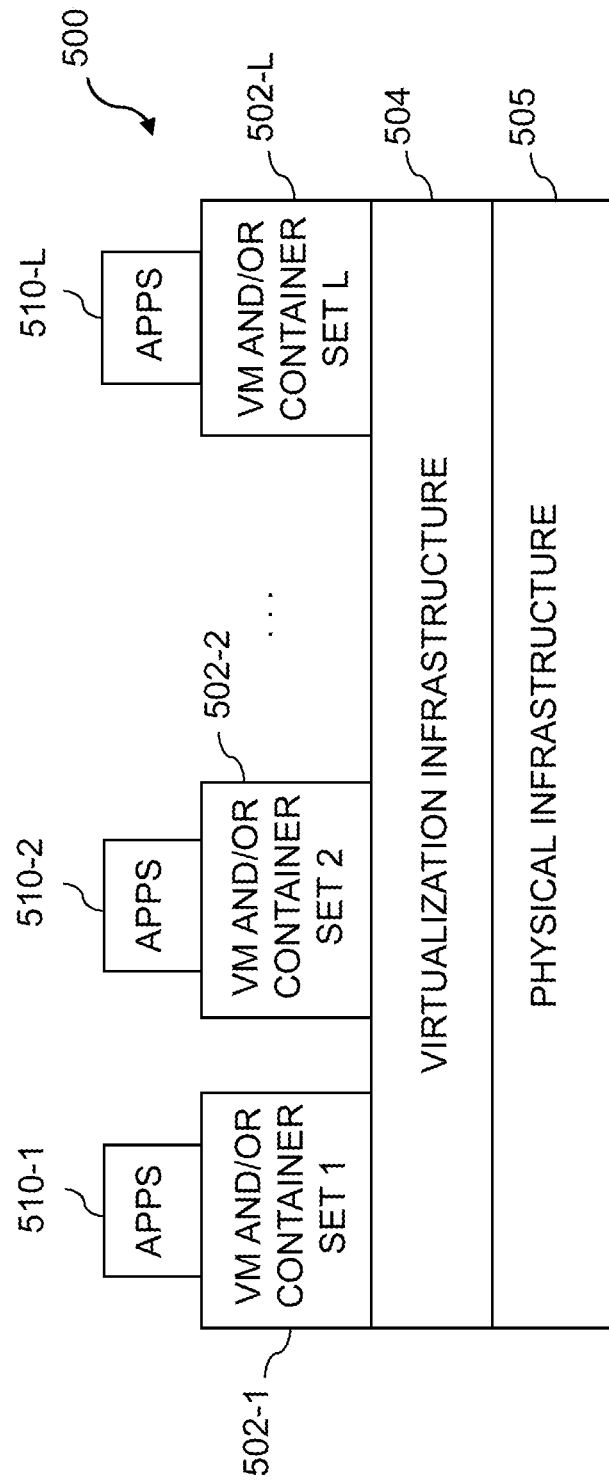

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide storage volume addition functionality of the type described above for one or more processes running on a given one of the VMs. For example, each of the VMs can implement replication control logic with support for storage volume addition functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide storage volume addition functionality of the type described above. For example, a container host device supporting multiple containers of one or more container sets can implement one or more instances of replication control logic with support for storage volume addition functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the storage volume addition functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, replication processes, storage volume addition processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to identify a storage volume to be added to a first consistency group of a first synchronous replication session between a first storage system and a second storage system in an active-active configuration;
   to create a second synchronous replication session for the added storage volume between the first storage system and the second storage system; and
   to merge the first and second synchronous replication sessions responsive to one or more designated criteria;
   wherein creating a second synchronous replication session for the added storage volume comprises:
   creating first and second instances of a second consistency group on the respective first and second storage systems using respective instances of the added storage volume;
   creating a volume pairing between the instances of the added storage volume on the first and second storage systems in order to establish data path mapping between the instances of the added storage volume;
   copying a volume identity of the instance of the added storage volume on the first storage system to a volume identity of the instance of the added storage volume on the second storage system;
   disabling input-output access for the instance of the added storage volume on the second storage system; and
   creating the second synchronous replication session between the first and second instances of the second consistency group.

2. The apparatus of claim 1 wherein said at least one processing device is implemented at least in part within at least one of the first and second storage systems.

3. The apparatus of claim 2 wherein said at least one processing device comprises a storage controller of at least one of the first and second storage systems.

4. The apparatus of claim 1 wherein the first and second storage systems in the active-active configuration service input-output operations received from at least one host device and directed to at least the first consistency group.

5. The apparatus of claim 1 wherein the first storage system is designated as a leader and the second storage system is designated as a follower in the active-active configuration.

6. The apparatus of claim 1 wherein the first and second storage systems comprise respective instances of the first consistency group.

7. The apparatus of claim 1 wherein said at least one processing device is further configured:
   to initiate a full synchronization cycle for the second consistency group;

to create first and second snap sets of a synchronized snap set pair for the respective first and second instances of the second consistency group on the first and second storage systems;
to initiate a transition from the full synchronization cycle to the second synchronous replication session;
in conjunction with the transition, to copy remaining differential data between the first snap set and the first instance of the consistency group on the first storage system to the second storage system; and
to enable the second synchronous replication session between the first and second instances of the second consistency group.

8. The apparatus of claim 1 wherein the second synchronous replication session is fully independent of the first synchronous replication session.

9. The apparatus of claim 1 wherein merging the first and second synchronous replication sessions responsive to one or more designated criteria comprises merging the first and second synchronous replication sessions responsive to the second synchronous replication session reaching a specified steady state.

10. The apparatus of claim 1 wherein merging the first and second synchronous replication sessions responsive to one or more designated criteria comprises:
setting a to-be-merged flag of the second synchronous replication session with a merge direction identifying the first synchronous replication session;
adding the instance of the added storage volume on the second storage system to an instance of the first consistency group on the second storage system;
adding the instance of the added storage volume on the first storage system to an instance of the first consistency group on the first storage system; and
enabling input-output access for the instance of the added storage volume on the second storage system;
wherein the to-be-merged flag is cleared subsequent to successful completion of the enabling.

11. The apparatus of claim 10 wherein said at least one processing device is further configured to terminate the second synchronous replication session subsequent to the successful completion of the enabling.

12. The apparatus of claim 10 wherein said at least one processing device is further configured to remove the first and second instances of the second consistency group from the first and second storage systems subsequent to the successful completion of the enabling.

13. The apparatus of claim 10 wherein said at least one processing device is further configured to automatically repeat the adding of the instance of the added storage volume on the second storage system to the instance of the first consistency group on the second storage system, the adding of the instance of the added storage volume on the first storage system to the instance of the first consistency group on the first storage system, and the enabling of the input-output access for the instance of the added storage volume on the second storage system, responsive to detection of the to-be-merged flag remaining set subsequent to completion of an initial iteration of those operations.

14. A method comprising:
identifying a storage volume to be added to a first consistency group of a first synchronous replication session between a first storage system and a second storage system in an active-active configuration;
creating a second synchronous replication session for the added storage volume between the first storage system and the second storage system; and
merging the first and second synchronous replication sessions responsive to one or more designated criteria;
wherein creating a second synchronous replication session for the added storage volume comprises:
creating first and second instances of a second consistency group on the respective first and second storage systems using respective instances of the added storage volume;
creating a volume pairing between the instances of the added storage volume on the first and second storage systems in order to establish data path mapping between the instances of the added storage volume;
copying a volume identity of the instance of the added storage volume on the first storage system to a volume identity of the instance of the added storage volume on the second storage system;
disabling input-output access for the instance of the added storage volume on the second storage system; and
creating the second synchronous replication session between the first and second instances of the second consistency group; and
wherein the method is implemented by at least one processing device comprising a processor coupled to a memory.

15. The method of claim 14 wherein merging the first and second synchronous replication sessions responsive to one or more designated criteria comprises:
setting a to-be-merged flag of the second synchronous replication session with a merge direction identifying the first synchronous replication session;
adding the instance of the added storage volume on the second storage system to an instance of the first consistency group on the second storage system;
adding the instance of the added storage volume on the first storage system to an instance of the first consistency group on the first storage system; and
enabling input-output access for the instance of the added storage volume on the second storage system;
wherein the to-be-merged flag is cleared subsequent to successful completion of the enabling.

16. A computer program product comprising a non-transitory processor-readable storage medium having stored therein program code of one or more software programs, wherein the program code when executed by at least one processing device causes said at least one processing device:
to identify a storage volume to be added to a first consistency group of a first synchronous replication session between a first storage system and a second storage system in an active-active configuration;
to create a second synchronous replication session for the added storage volume between the first storage system and the second storage system; and
to merge the first and second synchronous replication sessions responsive to one or more designated criteria;
wherein creating a second synchronous replication session for the added storage volume comprises:
creating first and second instances of a second consistency group on the respective first and second storage systems using respective instances of the added storage volume;
creating a volume pairing between the instances of the added storage volume on the first and second storage systems in order to establish data path mapping between the instances of the added storage volume;

copying a volume identity of the instance of the added storage volume on the first storage system to a volume identity of the instance of the added storage volume on the second storage system;

disabling input-output access for the instance of the added storage volume on the second storage system; and creating the second synchronous replication session between the first and second instances of the second consistency group.

17. The computer program product of claim 16 wherein merging the first and second synchronous replication sessions responsive to one or more designated criteria comprises:

setting a to-be-merged flag of the second synchronous replication session with a merge direction identifying the first synchronous replication session;

adding the instance of the added storage volume on the second storage system to an instance of the first consistency group on the second storage system;

adding the instance of the added storage volume on the first storage system to an instance of the first consistency group on the first storage system; and enabling input-output access for the instance of the added storage volume on the second storage system;

wherein the to-be-merged flag is cleared subsequent to successful completion of the enabling.

18. The computer program product of claim 16 wherein the program code when executed by the at least one processing device causes said at least one processing device:

to initiate a full synchronization cycle for the second consistency group;

to create first and second snap sets of a synchronized snap set pair for the respective first and second instances of the second consistency group on the first and second storage systems;

to initiate a transition from the full synchronization cycle to the second synchronous replication session;

in conjunction with the transition, to copy remaining differential data between the first snap set and the first instance of the consistency group on the first storage system to the second storage system; and to enable the second synchronous replication session between the first and second instances of the second consistency group.

19. The computer program product of claim 16 wherein the second synchronous replication session is fully independent of the first synchronous replication session.

20. The computer program product of claim 16 wherein merging the first and second synchronous replication sessions responsive to one or more designated criteria comprises merging the first and second synchronous replication sessions responsive to the second synchronous replication session reaching a specified steady state.

* * * * *